US009395708B2

(12) United States Patent  (10) Patent No.: US 9,395,708 B2
Perez et al.  (45) Date of Patent: Jul. 19, 2016

(54) SYSTEMS AND METHODS FOR ADAPTIVE SAMPLING RATE ADJUSTMENT

(71) Applicant: Johnson Controls Technology Company, Holland, MI (US)

(72) Inventors: Carlos Felipe Alcala Perez, Milwaukee, WI (US); Timothy I. Salsbury, Whitefish Bay, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 604 days.

(21) Appl. No.: 13/794,683

(22) Filed: Mar. 11, 2013

(65) Prior Publication Data

US 2014/0257528 A1    Sep. 11, 2014

(51) Int. Cl.
*G05B 13/04*    (2006.01)
(52) U.S. Cl.
CPC ..................... *G05B 13/047* (2013.01)
(58) Field of Classification Search
CPC .................................................. G05B 13/047
See application file for complete search history.

(56) References Cited

U.S. PATENT DOCUMENTS

| | | | | |
|---|---|---|---|---|
| 3,763,490 A * | 10/1973 | Hadley | ............... | H04B 7/086 342/375 |
| 3,864,639 A * | 2/1975 | Musgrave | ............. | G01P 5/18 327/356 |
| 4,755,795 A * | 7/1988 | Page | ................. | G01R 23/165 341/122 |
| 5,977,957 A * | 11/1999 | Miller | ................. | G06F 1/32 178/18.01 |
| 6,937,909 B2 | 8/2005 | Seem | | |
| 7,024,336 B2 | 4/2006 | Salsbury et al. | | |
| 7,289,936 B2 | 10/2007 | Singhal et al. | | |
| 7,505,877 B2 | 3/2009 | Salsbury | | |
| 7,522,071 B2 * | 4/2009 | Caselli | ............... | G05B 21/02 341/50 |
| 7,827,813 B2 | 11/2010 | Seem | | |
| 8,096,140 B2 | 1/2012 | Seem | | |
| 8,446,530 B2 * | 5/2013 | Bellers | ............... | H03M 1/127 348/571 |
| 8,495,888 B2 | 7/2013 | Seem | | |
| 8,620,628 B2 * | 12/2013 | Yu | ....................... | G06F 8/00 703/2 |
| 2001/0038316 A1 * | 11/2001 | Kondoh | ............ | G05B 5/01 331/17 |
| 2005/0221514 A1 * | 10/2005 | Pasadyn | ............ | G05B 11/42 438/14 |
| 2010/0204808 A1 * | 8/2010 | Thiele | ................ | G05B 17/02 700/30 |
| 2012/0170639 A1 * | 7/2012 | Salsbury | ........... | G05B 13/048 375/233 |
| 2013/0197676 A1 | 8/2013 | Salsbury et al. | | |
| 2014/0101420 A1 * | 4/2014 | Wu | ...................... | G06F 1/3206 713/1 |

\* cited by examiner

*Primary Examiner* — M. N. Von Buhr
(74) *Attorney, Agent, or Firm* — Foley & Lardner LLP

(57) ABSTRACT

A method for adaptively and automatically adjusting a sampling rate in a feedback control system includes monitoring an error signal for a disturbance event, evaluating the error signal in response to the disturbance event to estimate a time constant of a control process, and determining a sampling rate for use in the feedback control system based on the estimated time constant. The error signal may be based on a difference between a setpoint and a feedback signal and the feedback signal may be received from the control process.

19 Claims, 5 Drawing Sheets

SYSTEMS AND METHODS FOR ADAPTIVE SAMPLING RATE ADJUSTMENT

BACKGROUND

The present invention relates generally to the field of feedback controllers. The present invention relates more specifically to systems and methods for determining an appropriate sampling rate for a feedback controller.

Feedback controllers are used to control a wide variety of systems and processes. Typically, a feedback controller receives a measured value of a controlled variable (e.g., a feedback signal) and adjusts an input provided to a control device based on the measured value. The object of feedback controllers is to adjust the input provided to the device in a way that maintains a controlled variable at a desired setpoint.

Many feedback controllers respond to a feedback signal based on one or more control parameters. One control parameter frequently used in feedback control processes is a proportional gain (i.e., the proportional term, the gain, etc.). Feedback controllers typically apply the proportional gain as a multiplier to an error signal (e.g., a difference between a setpoint and a feedback signal) in determining an input to provide to the controlled system or process. In addition to the proportional gain, feedback controllers can use other control parameters such as an integral term (e.g., in a proportional-integral (PI) controller) and/or a derivative term (e.g., in a proportional-integral-derivative (PID) controller, etc.).

For dynamic systems in which conditions outside of the control loop affect the controlled variable or where an aspect of the control loop is variably imperfect, the optimal control parameters may also be dynamic. Accordingly, some feedback controllers automatically adjust the control parameters (e.g., the controller is "tuned") based on observed behavior of the system. Some feedback controllers include adaptive tuning algorithms that automatically adjust the control parameters during normal operation. Such adaptive tuning algorithms can provide for improved performance relative to other tuning strategies.

The rate at which measurements are collected from the controlled system or process (e.g., the sampling rate) can affect the operation of an adaptive tuning algorithm. If the sampling rate is too fast, the feedback controller may tune improperly and the proportional gain may be too small. If the sampling rate is too slow, the performance of the feedback controller may suffer. It is often challenging to determine an appropriate sampling rate for a feedback control system.

SUMMARY

One implementation of the present disclosure relates to a method for adaptively and automatically adjusting a sampling rate in a feedback control system. The method includes monitoring an error signal for a disturbance event, evaluating the error signal in response to the disturbance event to estimate a time constant of a control process, and determining a sampling rate for use in the feedback control system based on the estimated time constant. The error signal may be based on a difference between a setpoint and a feedback signal and the feedback signal may be received from the control process.

In some embodiments, monitoring the error signal for the disturbance event includes identifying the disturbance event as at least one of a setpoint change and a load disturbance. If the disturbance event is identified as a setpoint change, evaluating the error signal in response to the disturbance event may include tracking an area bounded by the error signal in response to the setpoint change and dividing the tracked area by a magnitude of the setpoint change to determine the estimated time constant of the control process. If the disturbance event is identified as a load disturbance, evaluating the error signal in response to the disturbance event may include tracking a magnitude of the error signal in response to the load disturbance, determining a time at which the magnitude of the error signal reaches a maximum in response to the load disturbance, and subtracting a time at which the magnitude of the error signal begins to increase in response to the load disturbance from the time at which the magnitude of the error signal reaches the maximum to determine the estimated time constant of the control process.

In some embodiments, determining a sampling rate for use in the feedback control system includes selecting a sampling interval which is a fraction of the estimated time constant. In more specific embodiments, determining a sampling rate for use in the feedback control system includes selecting a sampling interval between one-fortieth of the estimated time constant and the estimated time constant.

In some embodiments, the method further includes comparing the determined sampling rate with a previous sampling rate used by the feedback control system and updating the previous sampling rate to the determined sampling rate if the comparison reveals that one or more updating criteria are met. The updating criteria may include updating the previous sampling rate to the determined sampling rate if the determined sampling rate is at least twice the previous sampling rate or no greater than half the previous sampling rate.

Another implementation of the present disclosure is a method for estimating a time constant of a process under closed loop feedback control. The method includes monitoring an error signal for a disturbance event, determining whether the disturbance event qualifies as a setpoint change or a load disturbance, and evaluating the error signal in response to the determination of a setpoint change or a load disturbance to estimate a time constant of a control process. The error signal may be based on a difference between a setpoint and a feedback signal and the feedback signal may be received from the control process.

Evaluating the error signal in response to a setpoint change may include tracking an area bounded by the error signal in response to the setpoint change and dividing the tracked area by a magnitude of the setpoint change to determine the estimated time constant of the control process. Evaluating the error signal in response to a load disturbance may include tracking a magnitude of the error signal in response to the load disturbance, determining a time at which the magnitude of the error signal reaches a maximum in response to the load disturbance, and subtracting a time at which the magnitude of the error signal begins to increase in response to the load disturbance from the time at which the magnitude of the error signal reaches the maximum to determine the estimated time constant of the control process.

Another implementation of the present disclosure is a feedback control system for operating a control process. The feedback control system includes a process controller having a processing circuit configured to monitor an error signal for a disturbance event, evaluate the error signal in response to the disturbance event to estimate a time constant of a control process, and determine a sampling rate for use in the feedback control system based on the estimated time constant. The error signal may be based on a difference between a setpoint and a feedback signal and the feedback signal may be received from the control process.

In some embodiments, monitoring the error signal for the disturbance event includes identifying the disturbance event as at least one of a setpoint change and a load disturbance. If the disturbance event is identified as a setpoint change, evaluating the error signal in response to the disturbance event may include tracking an area bounded by the error signal in response to the setpoint change and dividing the tracked area by a magnitude of the setpoint change to determine the estimated time constant of the control process. If the disturbance event is identified as a load disturbance, evaluating the error signal in response to the disturbance event may include tracking a magnitude of the error signal in response to the load disturbance, determining a time at which the magnitude of the error signal reaches a maximum in response to the load disturbance, and subtracting a time at which the magnitude of the error signal begins to increase in response to the load disturbance from the time at which the magnitude of the error signal reaches the maximum to determine the estimated time constant of the control process.

In some embodiments, determining a sampling rate for use in the feedback control system includes selecting a sampling interval no greater than the estimated time constant. In more specific embodiments, determining a sampling rate for use in the feedback control system includes selecting a sampling interval approximately one-tenth of the estimated time constant.

In some embodiments, the processing circuit is further configured to compare the determined sampling rate with a previous sampling rate used by the feedback control system and update the previous sampling rate to the determined sampling rate if the comparison reveals that one or more updating criteria are met. The updating criteria may include updating the previous sampling rate to the determined sampling rate if the determined sampling rate is at least twice the previous sampling rate or no greater than half the previous sampling rate.

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limited.

Referring generally to the figures, systems and methods for adaptively adjusting a sampling rate in a feedback control system are shown, according to various exemplary embodiments. The systems and methods described herein automatically estimate a time constant for a controlled process or system and automatically set the sampling rate based on the estimated time constant. The time constant is estimated by analyzing an error signal (e.g., a difference between a setpoint and a feedback signal received from the controlled system).

Estimating the time constant includes determining whether the system is subject to a setpoint change or a load disturbance. If the system is subject to a setpoint change, the time constant is estimated by integrating the error signal (e.g., numerically, analytically, etc.) to determine an area under the error curve. The area under the error curve may be divided by the magnitude of the setpoint change to determine the estimated time constant. If the system is subject to a load disturbance, the time constant may be estimated by determining a time at which the error signal reaches an extremum (e.g., a minimum or a maximum) in response to the load disturbance. The time value at which the load disturbance begins may be subtracted from the time value at which the error signal reaches the extremum to determine the estimated time constant. The estimated time constant may be used to automatically and adaptively set the sampling rate for the feedback control system, without manual observation or adjustment.

The systems and methods described herein may be incorporated into an existing feedback controller (e.g., a proportional-integral (PI) controller, a proportional-integral-derivative (PID) controller, a pattern recognition adaptive controller (PRAC), etc.) or supplement an existing feedback control system. Advantageously, the adaptively determined sampling rate may improve the adaptive feedback controller's performance in determining optimal control parameters (e.g., a proportional gain, an integral time, etc.) for the controlled process or system.

Figure 1:
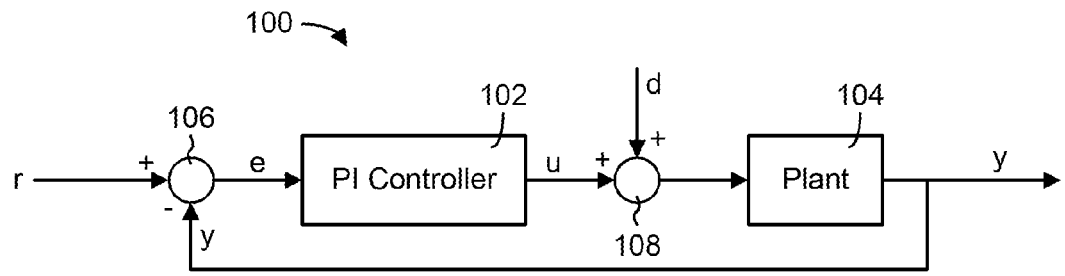
FIG. 1 is a block diagram of a closed-loop control system including a proportional integral (PI) controller and a plant, illustrating the application of a setpoint r and a load disturbance d to the closed-loop system, according to an exemplary embodiment.

Referring now to FIG. 1, a block diagram of a closed-loop control system 100 is shown, according to an exemplary embodiment. System 100 may be a building management system or part of a building management system (e.g., a HVAC control system, a lighting control system, a power control system, a security system, etc.). System 100 may be a local or distributed control system used to control a single building, a system of buildings, one or more zones within a building. In some implementations, system 100 may be a METASYS® brand control system as sold by Johnson Controls, Inc. System 100 is shown to include a PI controller 102, a plant 104, a subtractor element 106, and a summation element 108.

Plant 104 may be a system or process monitored and controlled by closed-loop system 100 (e.g., a control process). Plant 104 may be a dynamic system (e.g., a building, a system of buildings, a zone within a building, etc.) including one or more variable input devices (e.g., dampers, air handling units, chillers, boilers, actuators, motors, etc.) and one or more measurement devices (e.g., temperature sensors, pressure sensors, voltage sensors, flow rate sensors, humidity sensors, etc.). In some implementations, plant 104 may be a zone within a building (e.g., a room, a floor, an area, etc.) and control system 100 may be used to control temperature within the zone. For example, control system 100 may actively adjust a damper position in a HVAC unit (e.g., an air handling unit (AHU), a variable air volume (VAV) box, etc.) for increasing or decreasing the flow of conditioned air (e.g., heated, chilled, humidified, etc.) into the building zone.

Plant 104 may receive an input from summation element 108 which combines a control signal u with a disturbance signal d. In some embodiments, plant 104 may be modeled as a first-order plant having a transfer function $$G_p(s) = \frac{K_p}{1 + \tau_p s} e^{-Ls},$$

where $\tau_p$ is the dominant time constant, L is the time delay, and $K_p$ is the process gain. In other embodiments, plant 104 may be modeled as a second-order, third-order, or higher order plant. Plant 104 may produce a feedback signal y in response to control signal u and disturbance signal d. Feedback signal y may be subtracted from setpoint r at subtractor element 106 to produce an error signal e (e.g., e=r−y).

PI controller 102 is shown receiving error signal e from subtractor element 106. PI controller 102 may produce a control signal u in response to the error signal e. In some embodiments, controller 102 is a proportional-integral controller. PI controller 102 may have a transfer function $$G_c(s) = \frac{K_c(1 + T_i s)}{T_i s},$$

where $K_c$ is the controller gain and $T_i$ is the integral time. Controller gain $K_c$ and integral time $T_i$ are the control parameters which define the response of PI controller 102 to error signal e. That is, controller gain $K_c$ and integral time $T_i$ control how PI controller 102 translates error signal e into control signal u. In some embodiments, $K_c$ and $T_i$ are the only control parameters. In other embodiments, different control parameters (e.g., a derivative control parameter, etc.) may be used in addition to or in place of control parameters $K_c$ and $T_i$.

Still referring to FIG. 1, in the Laplace domain, the error signal e(s) may be expressed in terms of the setpoint r(s) as $$e(s) = r(s) \frac{1}{1 + G_c(s)G_p(s)}.$$

Error signal e(s) may be expressed in terms of the disturbance signal d(s) as $$e(s) = -d(s)G_p(s) \frac{1}{1 + G_c(s)G_p(s)}.$$

The common term in both expressions for the error signal may be rewritten as $$\frac{1}{1 + G_c(s)G_p(s)} = \frac{1}{1 + \frac{(K_p K_c)(1 + T_i s)}{T_i s(1 + \tau_p s)} e^{-Ls}}.$$

This expression can be simplified by assuming that $K_p K_c \approx 1$ and that $T_i \approx \tau_p$. The simplified closed-loop transfer function may then be expressed as $$\frac{1}{1 + G_c(s)G_p(s)} = \frac{\tau_p s}{\tau_p s + e^{-Ls}}.$$

Figure 2:
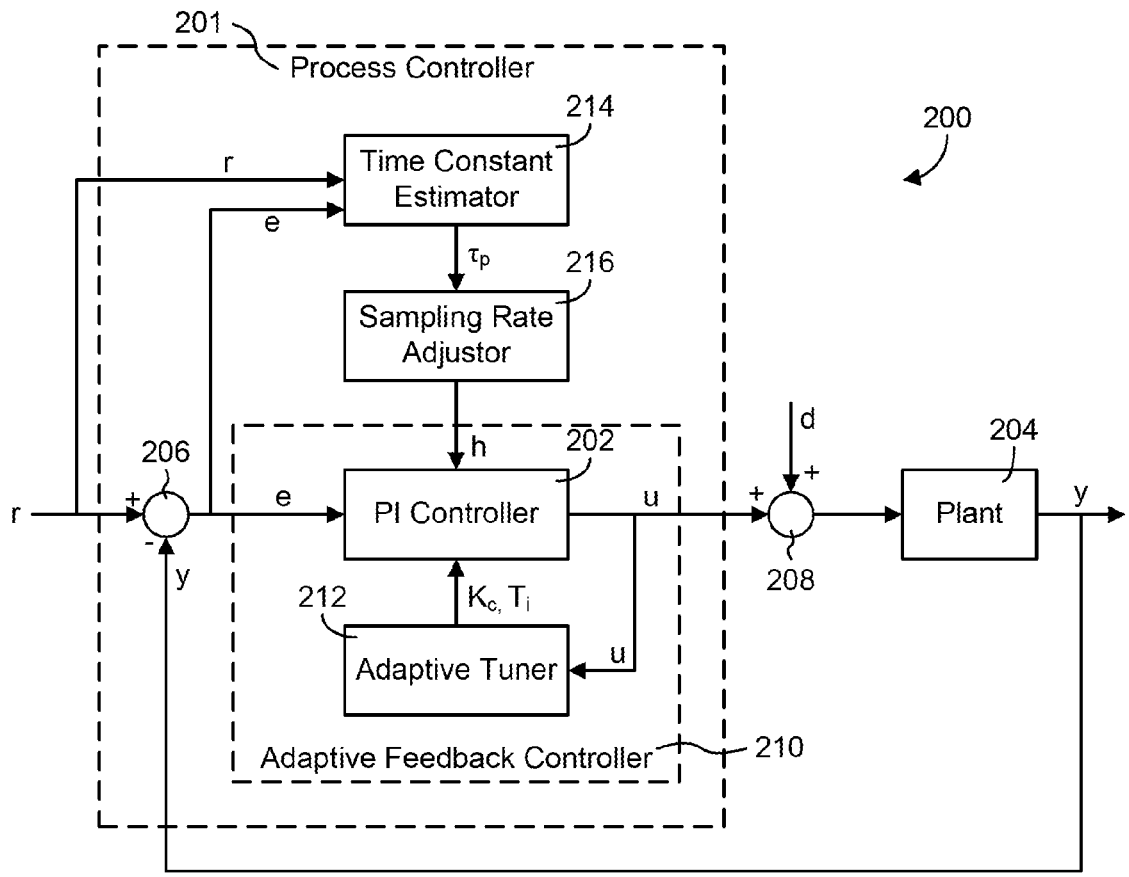
FIG. 2 is a block diagram of an adaptive feedback control system including an adaptive feedback controller, a time constant estimator configured to estimate a time constant $\tau_p$ for the plant based on an error signal e, and a sampling rate adjustor configured to determine a sampling rate h for the adaptive feedback controller based on the estimated time constant $\tau_p$, according to an exemplary embodiment.

Referring now to FIG. 2, a block diagram of a closed-loop system 200 is shown, according to an exemplary embodiment. System 200 is shown to include a process controller 201 having an adaptive feedback controller 210, a time constant estimator 214, and a sampling rate adjustor 216. Adaptive feedback controller 210 may be a pattern recognition adaptive controller (PRAC), a model recognition adaptive controller (MRAC), or any other type of adaptive tuning or feedback controller. PRAC controllers are described in greater detail in U.S. Pat. Nos. 5,355,305, 5,506,768, and 6,937,909, as well as other resources.

Adaptive feedback controller 210 may include a proportional-integral (PI) controller, a proportional-derivative (PD) controller, a proportional-integral-derivative (PID) controller, or any other type of controller which generates a control signal in response to a feedback signal, an error signal, and/or a setpoint. Adaptive feedback controller 210 may be any type of feedback controller (e.g., PRAC, MRAC, PI, etc.) which adaptively adjusts one or more controller parameters (e.g., a proportional gain, an integral time, etc.) used to generate the control signal. Adaptive feedback controller 210 is shown to include a PI controller 202 and an adaptive tuner 212.

PI controller 202 may be the same or similar to PI controller 102 described in reference to FIG. 1. For example, PI controller 202 may be a proportional-integral controller having a transfer function $$G_c(s) = \frac{K_c(1 + T_i s)}{T_i s}.$$

PI controller 202 may receive an error signal e from subtractor element 206 and provide a control signal u to summation element 208. Summation element 208 may combine control signal u with a disturbance signal d and provide the combined signal to plant 204. Elements 206, 208, and plant 204 may be the same or similar to elements 106, 108, and plant 104 as described in reference to FIG. 1.

Adaptive tuner 212 may periodically adjust (e.g., calibrate, tune, update, etc.) the control parameters used by PI controller 202 in translating error signal e into control signal u. The control parameters determined by adaptive tuner 212 may include a controller gain $K_c$ and an integral time $T_i$. Adaptive tuner 212 may receive control signal u from PI controller 202 and adaptively determine control parameters $K_c$ and $T_i$ based on control signal u (e.g., as described in the aforementioned U.S. Patents). Adaptive tuner 212 provides the control parameters $K_c$ and $T_i$ to PI controller 202.

Still referring to FIG. 2, system 200 is further shown to include a time constant estimator 214. Time constant estimator 214 determines a dominant time constant $\tau_p$ for plant 204. The estimated time constant $\tau_p$ is then used by sampling rate adjuster 216 to adaptively determine an appropriate sampling rate h for PI controller 202. Time constant $\tau_p$ may also be used to predict the response of plant 204 to a given control signal u. Time constant estimator 214 is shown receiving setpoint r as well as error signal e. In other embodiments, time constant estimator 214 may receive only error signal e or may calculate error signal e based on setpoint r and feedback signal y (e.g., e=r−y). Time constant estimator 214 may determine the dominant time constant $\tau_p$ based on error signal e, setpoint r, and/or other inputs received from various components of control system 200. In some embodiments, time constant estimator 214 may estimate a time constant based on control signal u (e.g., in a feed forward, model predictive control, and/or open loop control system). In some embodiments, control signal u may be used in place of or in addition to error signal e in estimating a time constant.

The process used to estimate time constant $\tau_p$ may depend on whether system 200 is subject to a setpoint change or a load disturbance. A setpoint change is an increase or decrease in setpoint r. A setpoint change may be instantaneous (e.g., a sudden change from a first setpoint value to a second setpoint value) or gradual (e.g., a ramp increase or decrease, etc.). A setpoint change may be initiated by a user (e.g., adjusting a temperature setting on a thermostat) or received from another controller or process (e.g., a supervisory controller, an outer loop cascaded controller, etc.).

If system 200 is subject to a setpoint change, time constant estimator 214 may estimate time constant $\tau_p$ by integrating the error signal e (e.g., numerically, analytically, etc.) to determine an area A under the error curve. Time constant estimator 214 may then divide the area under the error curve A by a magnitude of the setpoint change a to determine the estimated time constant $\tau_p$ $$\left(e.g., \tau_p = \frac{A}{a}\right).$$

A load disturbance is an uncontrolled input applied to plant 204. For example, in a temperature control system for a building, the load disturbance may include heat transferred through the external walls of the building or through an open door (e.g., during a particularly hot or cold day). The load disturbance may be measured or unmeasured. In some embodiments, time constant estimator 214 receives a signal (e.g., a status indicator, a process output, etc.) from adaptive feedback controller 210 indicating whether system 200 is subject to a setpoint change or a load disturbance. In other embodiments, time constant estimator 214 determines whether a setpoint change or load disturbance has occurred by analyzing the error signal e and/or setpoint r.

If system 200 is subject to a load disturbance, time constant estimator 214 may estimate the time constant $\tau_p$ by determining a time $t_{ex}$ at which the error signal e reaches an extremum (e.g., a minimum or a maximum) in response to the load disturbance. Time constant estimator 214 may subtract a time at which the load disturbance begins $t_d$ from the time at which error signal e reaches an extremum $t_{ex}$ in response to the load disturbance to determine the estimated time constant $\tau_p$ (e.g., $\tau_p = t_{ex} - t_d$). The systems and methods used to estimate the time constant $\tau_p$ in response to a setpoint change and load disturbance are described in greater detail in reference to FIG. 3 and FIG. 4 respectively.

In some embodiments, time constant estimator 214 determines time constant $\tau_p$ in response to an identified load disturbance or setpoint change. Advantageously, time constant estimator 214 may determine time constant $\tau_p$ in real time (e.g., immediately after sufficient data has been collected to perform the aforementioned calculations). For example, time constant estimator 214 may monitor error signal e for a sign change (e.g., positive to negative, negative to positive, zero crossings, etc.). Upon the occurrence of a load disturbance or setpoint change, the error signal e may experience a "zero crossing" and increase or decrease until reaching an extremum. PI controller 202 may attempt to reduce the magnitude of error signal e by manipulating control input u. Upon reaching a steady-state, error signal e may experience another "zero crossing" as the error signal e approaches and/or crosses zero. Time constant estimator 214 may use the zero crossings as time boundaries for calculating the area under error signal e or for calculating a time difference between $t_d$ and $t_{ex}$.

In other embodiments, time constant estimator may determine $\tau_p$ using historical disturbance data. In some embodiments, time constant estimator 214 is local to the controlled process or system for which the time constant $\tau_p$ is estimated. In other embodiments, time constant estimator may be implemented remotely (e.g., in the "cloud," on a supervisory level, etc.). Time constant estimator 214 may be part of PI controller 202, adaptive tuner 212, or implemented separately from such components.

In some embodiments, time constant estimator 214 determines whether a disturbance (e.g., a load disturbance or setpoint change) exceeds a significance threshold before proceeding with the time constant estimation process. For example, time constant estimator 214 may compare a magnitude of the error signal e in response to the disturbance with a threshold value. The magnitude of the error signal e may be a maximum or minimum magnitude after the occurrence of a disturbance. In some embodiments, the threshold value is a noise threshold (e.g., an upper noise threshold, a lower noise threshold, a noise band, etc.). The threshold value may be pre-defined (e.g., retrieved from memory, specified by a user, etc.) or automatically determined based on steady-state measurements obtained from the controlled system or process. In other embodiments, the threshold value is an area threshold (e.g., an area under the error curve), a time threshold, or a combination thereof. For example, time constant estimator 214 may compare the area under the error curve in response to a disturbance with a threshold area value. If the integrated area exceeds the threshold value, time constant estimator 214 may determine that the disturbance is significant. Time constant estimator 214 may proceed with the time constant estimation process if a disturbance is determined to be significant. In some embodiments, time constant estimator 214 does not proceed to estimate the time constant $\tau_p$ if a disturbance is not determined to be significant. In other embodiments, time constant estimator 214 does not determine the significance of disturbances and/or estimates $\tau_p$ regardless of a determined significance.

Still referring to FIG. 2, system 200 is further shown to include a sampling rate adjustor 216. Sampling rate adjustor 216 may receive the estimated time constant $\tau_p$ from time constant estimator 214 and calculate a sampling rate h based on the estimated time constant $\tau_p$. In some embodiments, sampling rate h defines a sampling interval or sampling frequency used by PI controller 202 to obtain feedback measurements from the controlled system or process (e.g., plant 204). In other embodiments, sampling rate h defines a rate at which the control signal u is adjusted by PI controller 202. In further embodiments, sampling rate h defines a rate at which control parameters $K_c$ and $T_i$ are updated by adaptive tuner 212.

In some embodiments, sampling rate adjustor 216 may set sampling rate h to a value between one-fiftieth of the estimated time constant $\tau_p$ and the estimated time constant $\tau_p$ (e.g., $$\frac{\tau_p}{50} \le h \le \tau_p).$$

In more specific embodiments, the sampling rate h may be set to a value between one-fortieth of the estimated time constant $\tau_p$ and the estimated time constant $\tau_p$ (e.g., $$\frac{\tau_p}{40} \le h \le \tau_p).$$

In some embodiments, the sampling rate h may be set to a value between one-twentieth of the estimated time constant $\tau_p$ and one-third of the estimated time constant $\tau_p$ (e.g., $$\frac{\tau_p}{20} \le h \le \frac{\tau_p}{3}).$$

In an exemplary embodiment, the sampling rate h may be set to a value approximately equal to one-tenth of the estimated time constant $\tau_p$ $$(e.g., h \approx \frac{\tau_p}{10}).$$

In some embodiments, sampling rate adjustor 216 may be combined with time constant estimator 214, PI controller 202, or adaptive tuner 212.

In some embodiments, sampling rate adjustor 216 compares the calculated sampling rate h with a current or previous sampling rate $h_0$. If the calculated sampling rate h differs significantly from $h_0$, the sampling rate may be updated to the recently calculated value h. In some embodiments, the current sampling rate $h_0$ is updated to the new sampling rate h if the new sampling rate h is greater than or equal to twice the current sampling rate (e.g., $h \ge 2h_0$). In other embodiments, the current sampling rate $h_0$ is updated to the new sampling rate h if the new sampling rate h is less than half the current sampling rate (e.g., $h \le 0.5h_0$). In further embodiments, sampling rate adjustor 216 may update the current sampling rate $h_0$ if the difference between the current sampling rate $h_0$ and the calculated sampling rate h exceeds a difference threshold (e.g., $|h_0 - h|$ > threshold) or if the ratio between $h_0$ and h exceeds a ratio threshold $$(e.g., \frac{h_0}{h} > threshold).$$

The updated sampling rate h may be communicated to adaptive feedback controller 210.

Advantageously, a properly set sampling rate h (e.g., a sampling rate which is a function of the process time constant $\tau_P$), may provide improved stability and control functionality for adaptive feedback controller 210. Adaptively and automatically determining sampling rate h may eliminate the need for human intervention (e.g., a trial and error approach or a rough estimation of the proper sampling rate) to properly configure a wide variety of control systems.

Figure 3:
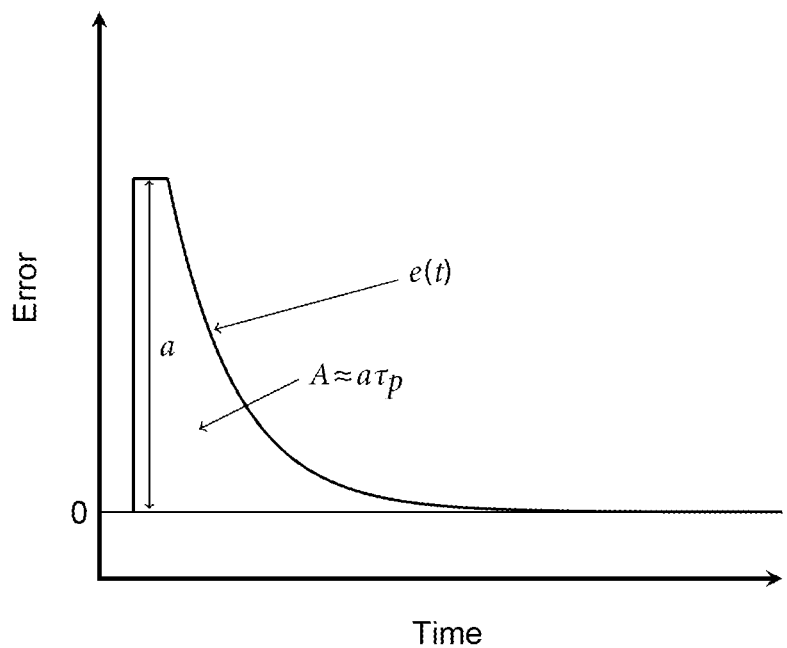
FIG. 3 is a graph of the error signal e used by the adaptive feedback control system of FIG. 2 in response to a step change in the setpoint r, according to an exemplary embodiment.

Referring now to FIG. 3, a graph 300 illustrating the time response of error signal e to a change in setpoint r is shown, according to an exemplary embodiment. Graph 300 shows error signal e as a function of time in response to an step increase of magnitude a in setpoint r. In some embodiments, the output y of plant 204 is a continuous variable unable to instantaneously increase or decrease. Because the error signal e is defined as the difference between setpoint r and output y (e.g., e=r-y), the error signal e may suddenly increase from a first value (e.g., e=0) immediately before the setpoint change to a second value immediately after the setpoint change. The second value may equal the magnitude a of the setpoint change. PI controller 202 may respond to the increase in error signal e by adjusting the control signal u applied to plant 204. Such adjustment may cause error signal e to continuously decrease from the magnitude a of the setpoint change to a steady state value (e.g., e=0).

Still referring to FIG. 3, time constant estimator 214 may estimate the time constant $\tau_p$ for plant 204 based on the response of error signal e to a step change in setpoint r. As was previously mentioned, in the Laplace domain the error signal e(s) may be expressed in terms of the setpoint r(s) as $$e(s) = r(s) \frac{1}{1 + G_c(s)G_p(s)},$$

$$\text{where } \frac{1}{1 + G_c(s)G_p(s)} = \frac{\tau_p s}{\tau_p s + e^{-Ls}}.$$

A step change of magnitude a in the setpoint produces the error signal $$e(s) = \frac{a\tau_p}{\tau_p s + e^{-Ls}}.$$

The area under the error curve in graph 300 may be determined by integrating the error signal e(s)

$$(e.g., I(s) = \frac{1}{s} e(s)).$$

In a stable system, the area A under the curve can be expressed as the difference in the areas at $t=\infty$ and $t=0$. That is, $$A = \lim_{s \to 0} \{sI(s)\} - \lim_{s \to \infty} \{sI(s)\} = a\tau_p.$$

From this expression, it is apparent that the time constant $\tau_p$ depends only on the magnitude a of the setpoint change and the area A under the error curve.

Time constant estimator 214 may track the area A under the error curve in response to a setpoint change and estimate the time constant $\tau_p$ according to the equation $$\tau_p = \frac{A}{a}.$$

The area A under the error curve may be tracked by multiplying the magnitude of the error signal e at each time step k by the duration of an interval between time steps $$\left( \text{e.g., } A = \sum_{k=1}^{n} e_k(t) \cdot \Delta t_k \right).$$

In some embodiments, the magnitude a of the setpoint change may be estimated based on the magnitude of the error signal e immediately after the setpoint change. In other embodiments, the magnitude a of the setpoint change may be determined by analyzing setpoint r or may be received as an input from adaptive feedback controller 210.

Still referring to FIG. 3, in some embodiments, time constant estimator 214 determines a time delay L for the controlled system or process (e.g. plant 204). The time delay L may represent an interval between the time at which an input is applied to a controlled system and the time at which the input begins to take effect. Time constant estimator 214 may determine time delay L by analyzing the response of error signal e to a setpoint change. For example, graph 300 shows the error signal e instantaneously changing to the magnitude a of the setpoint change immediately after the setpoint change occurs. The error signal e may maintain this value until after time delay L has passed and the dynamics of the system begin to take effect. Time constant estimator 214 may estimate the time delay L by subtracting a time at which the setpoint change occurs from the time at which the magnitude of the error signal e begins to decrease (e.g., in response to an adjusted control input u). In some embodiments, time constant $\tau_p$ and time delay L may be separately determined. In other embodiments, time constant $\tau_p$ and time delay L may be combined into a single variable (e.g., an average residence time, a dominant time constant, etc.)

Figure 4:
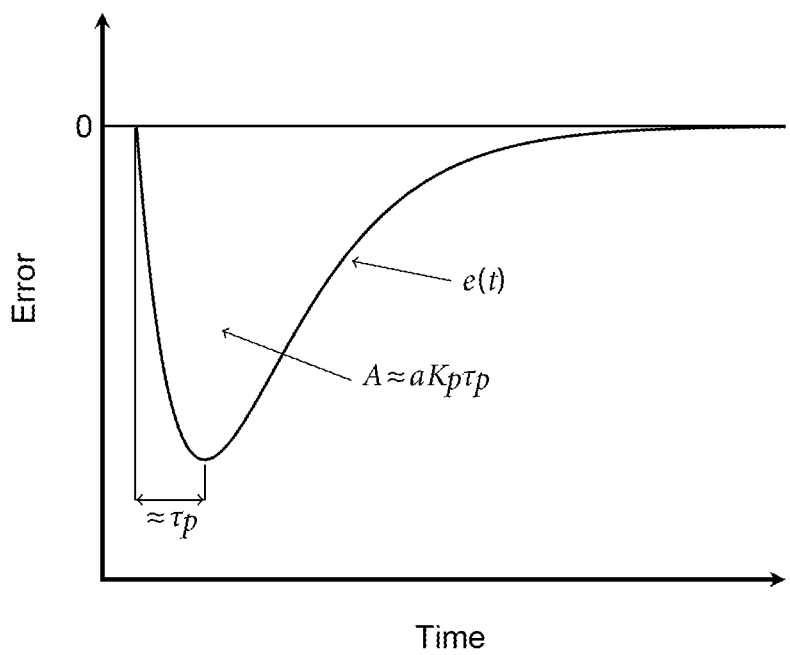
FIG. 4 is a graph of the error signal e used by the adaptive feedback control system of FIG. 2 in response to a step change in the load disturbance d, according to an exemplary embodiment.

Referring now to FIG. 4, a graph 400 illustrating the time response of error signal e to a load disturbance is shown, according to an exemplary embodiment. The load disturbance may be applied to plant 204 as an uncontrolled and/or unmeasured input. The load disturbance may cause a change in the output y received from plant 204 and consequently in error signal e (e.g., e=r−y). In some embodiments, the output y of plant 204 is a continuous variable unable to instantaneously increase or decrease. If the setpoint r is held constant, a load disturbance may cause a continuous increase or decrease in the error signal e (e.g., rather than the instantaneous increase or decrease caused by a setpoint change). Graph 400 shows the error signal e continuously decreasing in response to a load disturbance. The error signal e is shown decreasing from an initial value (e.g. e=0) to a minimum value $e_{min}$. In other embodiments, the load disturbance may cause an increase in the error signal from an initial value (e.g., e=0) to a maximum value e.

In the Laplace domain, the response of the error signal e to a step change of magnitude a in the load disturbance may be represented by the equation $$e(s) = \frac{aK_p\tau_p}{(\tau_p s + 1)(\tau_p s + e^{-Ls})} e^{-Ls},$$

where $K_p$ is the process gain and L is the time delay of the controlled system or process (e.g., plant 204). When a load disturbance occurs, the dynamics of the system do not begin to affect the error signal e until after the time delay L. Accordingly, the time delay L may be neglected and the response of the error signal e to a step change of magnitude a in the load disturbance may be represented by the equation $$e(s) = \frac{aK_p\tau_p}{(\tau_p s + 1)^2}.$$

In the time domain, the error signal e may be expressed as $$e(t) = aK_p\tau_p t e^{\frac{-t}{\tau_p}}.$$

The derivative of this expression is $$\dot{e}(t) = aK_p\tau_p t e^{\frac{-t}{\tau_p}} \left[ 1 - \frac{t}{\tau_p} \right].$$

An extremum (e.g., a maximum or minimum) of the error signal is found at time $t_{ex}$ when $\dot{e}(t)=0$. The extremum of the error signal e in response to a load disturbance may occur at a time approximately equal to the time constant $\tau_p$ after the disturbance has taken effect. Time constant estimator 214 may determine time constant $\tau_p$ by subtracting a time at which the magnitude of error signal e begins to increase $t_d$ in response to a load disturbance from a time at which error signal e reaches an extremum $t_{ex}$ in response to the load disturbance (e.g., $\tau_p = t_{ex} - t_d$).

Referring now to FIGS. 5A-5D, a series of graphs illustrating the expected advantages of adaptively updating sampling rate h are shown, according to an exemplary embodiment. In FIGS. 5A-5D, a simulated first order plant is provided with a control signal u determined by three different types of controllers—a proportional integral (PI) controller having optimal controller parameters ($PI_{opt}$), a pattern recognition adaptive controller (PRAC) having a fixed sampling rate h ($PRAC_{fixed}$), and a PRAC with an adaptively adjusted sampling rate h (e.g., using the systems and methods described in reference to FIGS. 2-4) ($PRAC_{adaptive}$).

Figure 5A:
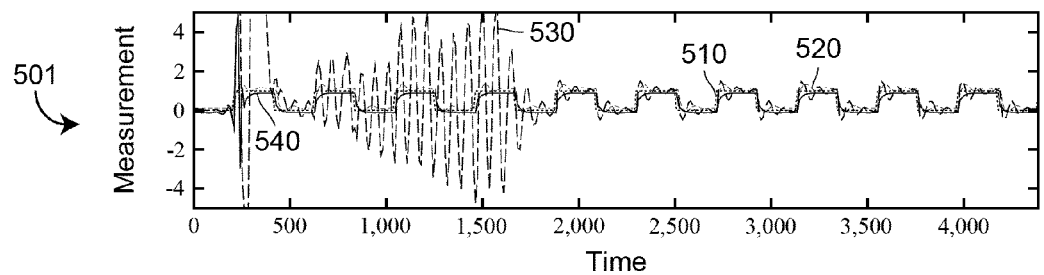
FIG. 5A is a graph of a feedback signal obtained from a controlled process as a function of time for several closed-loop control systems, illustrating the expected performance advantages of the adaptive feedback control system of FIG. 2, according to an exemplary embodiment.

Referring specifically to FIG. 5A, a graph 501 is shown illustrating the resultant measured variable y as a function of time when the simulated plant is independently subjected to a series of setpoint changes and load disturbances. The setpoint r is shown by line 510 and the performance of $PI_{opt}$, $PRAC_{fixed}$, and $PRAC_{adaptive}$ are shown by lines 520, 530, and 540 respectively. As can be seen from FIG. 5A, $PRAC_{adaptive}$ (line 540) demonstrates a superior ability to track setpoint r (e.g., control the measured variable y to equal the setpoint) when compared with $PRAC_{fixed}$ (line 530). The performance of $PRAC_{adaptive}$ may even exceed the performance of $PI_{opt}$ (line 520).

Figure 5B:
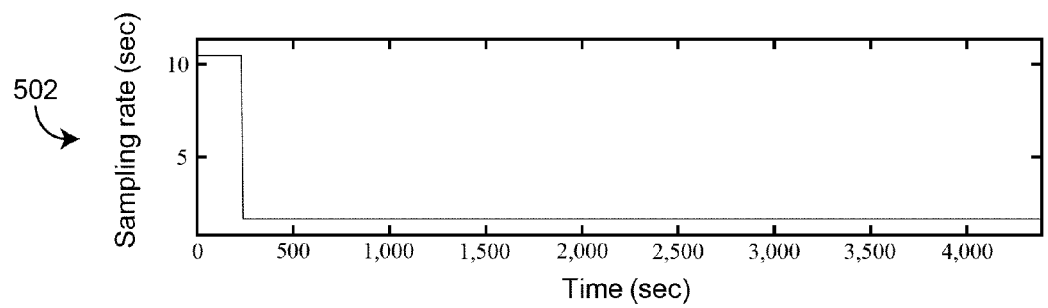
FIG. 5B is a graph of the sampling rate as a function of time as may be determined and used by the sampling rate adjustor of FIG. 2, according to an exemplary embodiment.

Referring to FIG. 5B, a graph 502 is shown illustrating the sampling rate h as a function of time for $PRAC_{adaptive}$. The sampling rate h is shown starting at a first value at t=0. At approximately t=250 seconds, the sampling rate h is adjusted to a lower value. Referring again to FIG. 5A, at approximately this same time (e.g., t≈250 seconds), the performance of $PRAC_{adaptive}$ significantly improves. Notably, $PRAC_{adaptive}$ is shown to adjust the sampling rate h only once throughout the simulation. The single sampling rate adjustment may suggest that time constant $\tau_p$ estimation (e.g., as described in reference to time constant estimator 214) and subsequent sampling rate adjustment (e.g., by sampling rate adjustor 216) accurately capture the true time constant $\tau_p$ of the simulated plant.

Figure 5C:
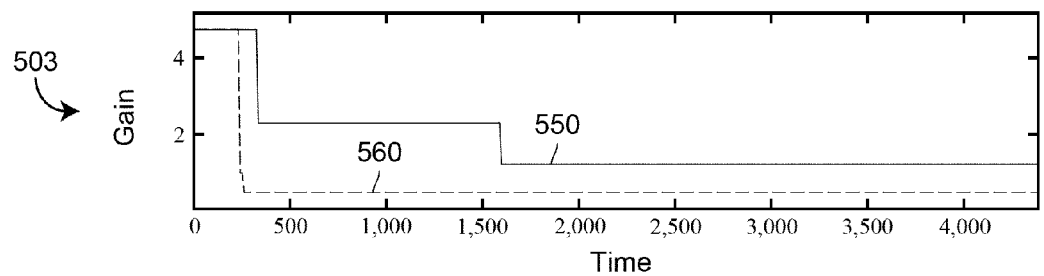
FIG. 5C is a graph of the controller gain parameter over time as may be determined and used by the adaptive feedback controller of FIG. 2 having an adaptively updated sampling rate, as well as the controller gain parameter determined by an adaptive feedback controller with a fixed sampling rate, illustrating the expected performance advantage of adaptively updating the sampling rate, according to an exemplary embodiment.
Figure 5D:
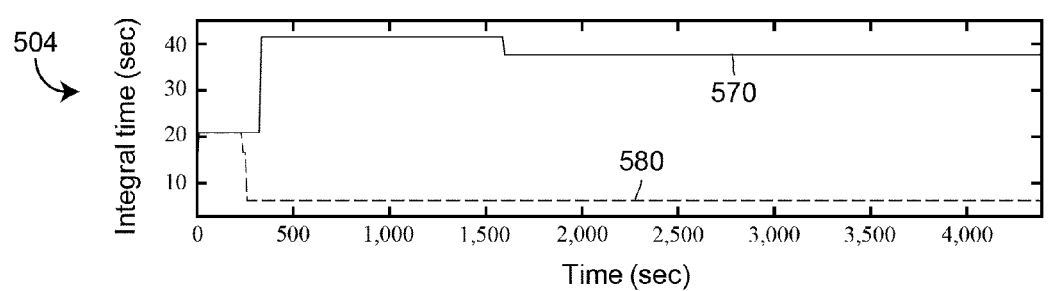
FIG. 5D is a graph of the integral time parameter over time as may be determined and used by the adaptive feedback controller of FIG. 2 having an adaptively updated sampling rate, as well as the integral time parameter determined by an adaptive feedback controller with a fixed sampling rate, illustrating a performance advantage of adaptively updating the sampling rate, according to an exemplary embodiment.

Referring to FIGS. 5C and 5D, graphs 503 and 504 are shown illustrating the controller gain parameter $K_c$ and integral time parameter $T_i$ (e.g., determined by adaptive tuner 212) as a function of time for $PRAC_{fixed}$ and for $PRAC_{adapfive}$. In FIG. 5C, line 550 illustrates the controller gain parameter $K_c$ for $PRAC_{fixed}$ and line 560 illustrates the gain parameter $K_c$ for $PRAC_{adaptiw}$. In FIG. 5D, line 570 illustrates the integral time parameter $T_i$ for $PRAC_{fixed}$ and line 580 illustrates the integral time parameter T for $PRAC_{adaptive}$. At approximately t=250 seconds (i.e., the same time that the sampling rate h is adjusted), $PRAC_{adaptive}$ compensates by adjusting the controller gain $K_c$ from an initial value to a lower value and by adjusting the integral time T from an initial value to a lower value. Notably, $PRAC_{adaptive}$ is shown to adjust the controller gain $K_c$ and integral time T only one time throughout the simulation. This single adjustment may suggest that once the sampling rate h is properly set, $PRAC_{adaptive}$ can accurately determine the appropriate controller gain $K_c$ and integral time $T_i$ without requiring subsequent correction.

Figure 6:
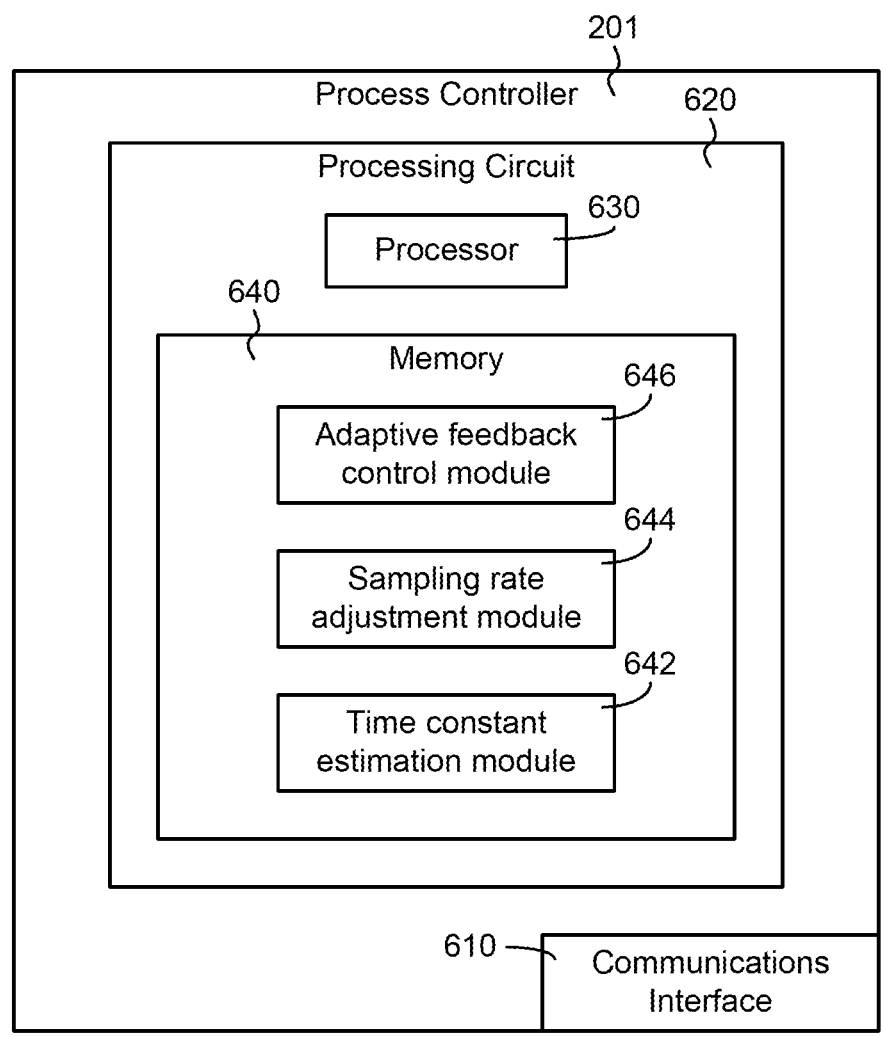
FIG. 6 is a detailed block diagram of the process controller of FIG. 2, according to an exemplary embodiment.

Referring now to FIG. 6, a block diagram of process controller 201 is shown, according to an exemplary embodiment. Process controller 201 is shown to include a communications interface 610 and a processing circuit 620. Communications interface 610 may include any number of jacks, wire terminals, wire ports, wireless antennas, or other communications adapters, hardware, or devices for communicating information (e.g., setpoint r information, error signal e information, feedback signal y information, etc.) or control signals (e.g., a control signal u, etc.) Communications interface 610 may be configured to send or receive information and/or control signals between process controller 201 and a controlled system or process (e.g., plant 204), between process controller 201 and a supervisory controller, or between process controller 201 and a local controller (e.g., a device, building, or network specific controller). Communications interface 610 may be configured to send or receive information over a local area network (LAN), wide area network (WAN), and/or a distributed network such as the Internet. Communications interface 610 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Processing circuit 620 is shown to include a processor 630 and memory 640. Processor 630 can be implemented as a general purpose processor, an application specific integrated circuit (ASIC), one or more field programmable gate arrays (FPGAs), a group of processing components, or other suitable electronic processing components.

Memory 640 (e.g., memory device, memory unit, storage device, etc.) is one or more devices (e.g., RAM, ROM, Flash memory, hard disk storage, etc.) for storing data and/or computer code for completing or facilitating the various processes, layers and modules described in the present disclosure. Memory 640 may be or include volatile memory or non-volatile memory. Memory 136 may include database components, object code components, script components, or any other type of information structure for supporting the various activities and information structures described in the present application. According to an exemplary embodiment, memory 640 is communicably connected to processor 630 via processing circuit 620 and includes computer code for executing (e.g., by processing circuit 620 and/or processor 630) one or more processes described herein. Memory 640 is shown to include a time constant estimation module 642, a sampling rate adjustment module 644, and an adaptive feedback control module 646.

Time constant estimation module 642 may be configured to perform the functions of time constant estimator 214 as described in reference to FIG. 2. Time constant estimation module 642 may receive an error signal e, a setpoint signal r, and or a feedback signal y. Time constant estimation module 642 may be configured to monitor the error signal e and estimate a time constant $\tau_p$ for a controlled system or process based on the error signal e. In some implementations, time constant estimation module 642 may determine whether the controlled system is to a setpoint change or a load disturbance (e.g., by receiving a signal from adaptive feedback control module 646, by analyzing the error signal e, etc.).

If the system is subject to a setpoint change, time constant estimation module 642 may estimate the time constant $\tau_p$ by determining an area under the error curve (e.g., defined by error signal e). The area under the error curve may be divided by the magnitude of the setpoint change to determine the estimated time constant $\tau_P$. If the system is subject to a load disturbance, the time constant $\tau_p$ may be estimated by determining a time at which the error signal e reaches an extremum (e.g., a minimum or a maximum) in response to the load disturbance. Time constant estimation module 642 may subtract the time value at which the load disturbance begins from the time value at which the error signal e reaches an extremum to determine the estimated time constant $\tau_P$. The error signal e may be monitored for zero crossings (e.g., a sign change from positive to negative or negative to positive) to determine the time at which a load disturbance begins. Time constant estimation module 642 may communicate the estimated time constant $\tau_p$ to sampling rate adjustment module 644.

Sampling rate adjustment module 644 may be configured to perform the functions of sampling rate adjustor 216 as described in reference to FIG. 2. Sampling rate adjustment module 644 may receive the estimated time constant from time constant estimation module 642 and calculate a sampling rate h based on the estimated time constant $\tau_P$. In some embodiments, sampling rate adjustment module 644 may set the sampling rate h to a value approximately equal to one-tenth of the estimated time constant $\tau_p$ $$\left(\text{e.g., } h \approx \frac{\tau_p}{10}\right).$$

In some embodiments, sampling rate adjustment module 644 compares the calculated sampling rate h with a current or previous sampling rate $h_0$. If the calculated sampling rate h differs significantly from $h_0$ (e.g., h is less than half $h_0$ or greater than twice $h_0$), sampling rate adjustment module may update the sampling rate to the recently calculated value h.

The updated sampling rate h may be communicated to adaptive feedback control module 646.

Adaptive feedback control module 646 may be configured to perform the functions of PI controller 202 and adaptive tuner 212 as described in reference to FIG. 2. Adaptive feedback control module 646 may include the functionality of a pattern recognition adaptive controller (PRAC), a model recognition adaptive controller (MRAC), or any other type of adaptive tuning or feedback controller. Adaptive feedback control module 646 may receive an error signal e representing a difference between a feedback signal y and a setpoint r. Adaptive feedback control module 646 may calculate a control signal u for a controlled process or system based on the error signal e. The control signal u may be communicated to the controlled process or system via communications interface 610.

Figure 7:
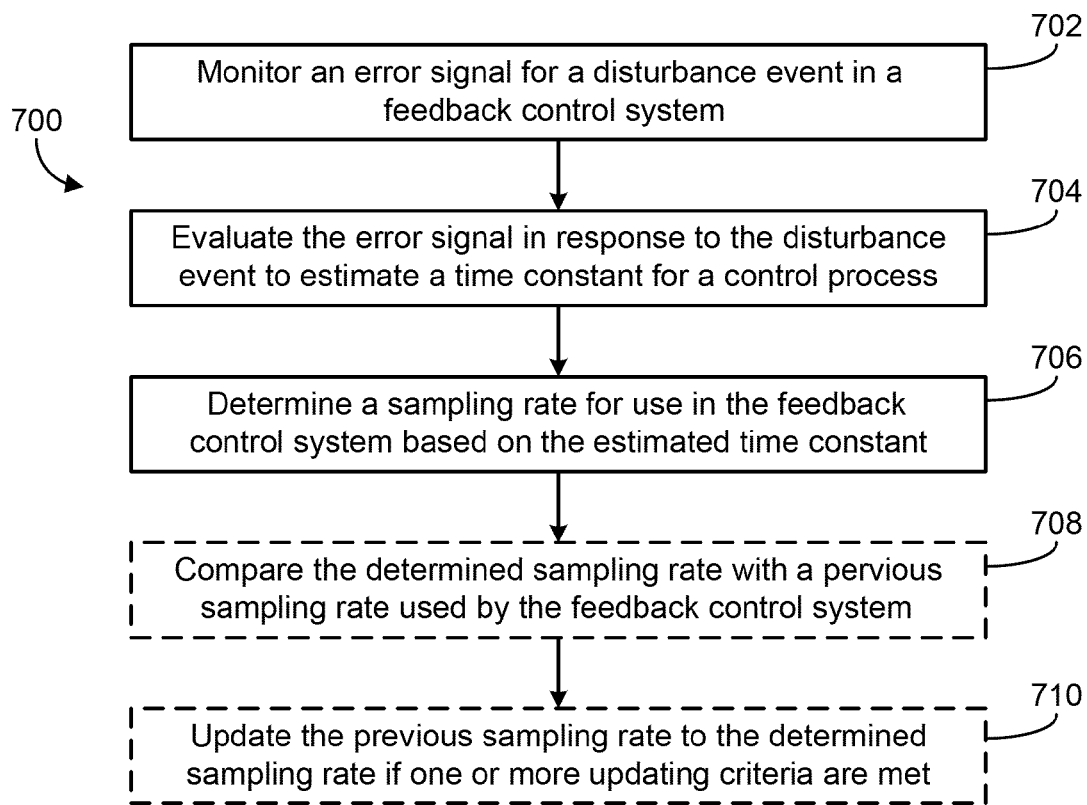
FIG. 7 is a flowchart of a process for adaptively adjusting a sampling rate in a feedback control system, according to an exemplary embodiment.

Referring now to FIG. 7, a flowchart of a process 700 for adaptively adjusting a sampling rate in a feedback control system is shown, according to an exemplary embodiment. Process 700 is shown to include monitoring an error signal for a disturbance event (step 702). The error signal e may be a difference between a setpoint r and a feedback signal y received from a control process or system. In some embodiments, step 702 includes determining whether a disturbance in the error signal e (e.g., a deviation in the error signal from a zero error steady state) qualifies as a disturbance event. Step 702 may involve comparing a magnitude of the error signal e or an area bounded by the error signal e to a threshold value. In some embodiments, the threshold value may be a noise threshold (e.g., measurement noise, process noise, combined noise, etc.). If the magnitude or area exceeds the threshold value, the disturbance may be classified as a disturbance event. In some embodiments, the remaining steps of process 700 (e.g., steps 704-710) are only performed if a detected disturbance qualifies as a disturbance event. In other embodiments, steps 704-710 are performed for all detected disturbances.

Step 702 may include identifying the disturbance event as at least one of a setpoint change and a load disturbance. In some embodiments, the disturbance event may be identified via a status indicator or signal received from an adaptive feedback controller. For example, a PRAC may output a signal indicating whether the control system is subject to a setpoint change or a load disturbance. In other embodiments, the disturbance event may be identified by analyzing the error signal e. For example, a setpoint change may result in an instantaneous change in the error signal e whereas a load disturbance may result in continuous increase in the magnitude of the error signal e.

Still referring to FIG. 7, process 700 is shown to further include evaluating the error signal in response to the disturbance event to estimate a time constant for a control process (step 704). If the disturbance event is identified as a setpoint change in step 702, evaluating the error signal e may involve tracking an area A bounded by the error signal e in response to the setpoint change. The area A bounded by the error signal may be an area between an error curve (e.g., a graphical representation of the error signal as a function of time) and the time axis (e.g., a "zero error" line extending along the time axis). The area A bounded by the error signal may be an area above the time axis (e.g., if the error curve includes positive error values) or an area below the time axis (e.g., if the error curve includes negative error values). The area A bounded by the error signal may be tracked analytically (e.g., by expressing the error signal as an equation, integrating the equation, $A = \int_0^x e(t)dt$, etc.) or numerically (e.g., by multiplying a magnitude of the error signal by a duration of a time step, adding the resultant products, $$A = \sum_{k=1}^{n} e_k(t) \cdot \Delta t_k,$$

etc.).

In some embodiments, the area A bounded by the error signal e may be tracked during a tracking interval. The tracking interval may begin at the time of the setpoint change and end at a time when the error signal e crosses the time axis (e.g., a "zero crossing"). In other embodiments, the tracking interval may end at a time when a magnitude of the error signal |e| crosses a magnitude threshold. The magnitude threshold may be a non-zero error value at which it may be determined that the control system has adequately responded to the disturbance event. In some embodiments, the magnitude threshold may be a noise threshold (e.g., measurement noise, process noise, etc.) for the controlled system or process.

If the disturbance event is identified as a setpoint change in step 702, step 704 may further include dividing the area A bounded by the error signal by a magnitude a of the setpoint change to determine the estimated time constant of the control process $$\left(e.g., \tau_p = \frac{A}{a}\right).$$

In some embodiments, the magnitude of the setpoint change may be obtained by analyzing the setpoint signal (e.g., subtracting a setpoint value before the setpoint change from a setpoint value after the setpoint change). In other embodiments, the magnitude a of the setpoint change may be obtained by analyzing the error signal e (e.g., determining the magnitude of the instantaneous increase in the magnitude of the error signal). In further embodiments, the magnitude a of the setpoint change may be received from another process or system.

Still referring to step 704, if the disturbance event is identified as a load disturbance in step 702, evaluating the error signal in response to the disturbance event may include tracking a magnitude of the error signal |e| in response to the load disturbance and determining a time at which the magnitude of the error signal |e| reaches a maximum in response to the load disturbance. The maximum magnitude of the error signal $|e|_{max}$ may be an extremum (e.g., a maximum value $e_{max}$ or minimum value $e_{min}$) in response to the load disturbance. Unlike setpoint changes, load disturbances may cause the magnitude of the error signal |e| to increase continuously (e.g., non-instantaneously) until reaching a maximum $|e|_{max}$ at a time $t_{ex}$ after the disturbance occurs. If the disturbance event is identified as a load disturbance in step 702, step 704 may involve subtracting a time $t_d$ at which the magnitude of the error signal begins to increase in response to the load disturbance from the time at which the magnitude of the error signal reaches the maximum $t_{ex}$ to determine the time constant of the control process (e.g., $\tau_p = t_{ex} - t_d$).

Still referring to FIG. 7, process 700 is shown to further include determining a sampling rate for use in the feedback control system based on the estimated time constant (step 706). The sampling rate h may be a sampling period (e.g., an interval between samples) or a sampling frequency (e.g., a rate at which samples are obtained). In some embodiments, the sampling rate h may be used to select a subset of measurements from a feedback signal y for use in determining a control signal u to be applied to a controlled process. In other embodiments, the sampling rate h may specify the interval at which the control signal u is updated. In some embodiments, step 706 may involve selecting a sampling rate h between one-fortieth of the estimated time constant $\tau_p$ and the estimated time constant $\tau_p$ $$\left(\text{e.g., } \frac{\tau_p}{40} \le h \le \tau_p\right).$$

In a more specific embodiment, step 706 may involve selecting a sampling rate h approximately one-tenth of the estimated time constant $\tau_p$ $$\left(\text{e.g., } h \approx \frac{\tau_p}{10}\right).$$

Still referring to FIG. 7, in some embodiments, process 700 may further include comparing the determined sampling rate h with a previous sampling rate $h_0$ used by the feedback control system (step 708) and updating the previous sampling rate $h_0$ to the determined sampling rate h if the comparison reveals that one or more updating criteria are met (step 710). The updating criteria may prevent the previous sampling rate $h_0$ from being updated if the change would be minimal or insignificant. For example, the updating criteria may include updating the previous sampling rate $h_0$ to the sampling rate h determined in step 706 if the determined sampling rate h is at least twice the previous sampling rate (e.g., $h \ge 2h_0$). In some embodiments, the previous sampling rate $h_0$ may be updated to the sampling rate h determined in step 706 if the determined sampling rate h is no greater than half the previous sampling rate (e.g., $h \le 0.5h_0$). In further embodiments, steps 708 and 710 may involve updating the previous sampling rate $h_0$ if the difference between the previous sampling rate $h_0$ and the sampling rate h determined in step 706 exceeds a difference threshold (e.g., $|h_0-h|>$threshold) or if the ratio between $h_0$ and h exceeds a ratio threshold $$\left(\text{e.g., } \frac{h_0}{h} > \text{threshold}, \frac{h}{h_0} > \text{threshold},\right.$$

etc.).

In some implementations, the systems and methods described herein may be used in a closed-loop feedback control system. When implemented in a closed-loop system, a disturbance event may be detected by monitoring an error signal (e.g., for a load disturbance or a setpoint change). The error signal may be based on a feedback signal received from a control process. In other implementations, the described systems and methods may be used in a feed-forward control system, and open loop control system, a model predictive control system, a cascaded control system, and/or any other type of automated control system. When implemented in non-feedback control systems, the disturbance event may be detected by monitoring a control signal (e.g., provided to a control process), a feed-forward signal (e.g., received from a feed-forward estimator), a sensor signal (e.g., from a sensor monitoring a variable other than the controlled variable), or any other type of signal (e.g., calculated or measured) communicated between one or more components of the control system. The monitored signal may be analyzed as described above (e.g., by time constant estimator 214) for estimating a time constant and determining a sampling rate for use in the non-feedback control system.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for adaptively and automatically adjusting a sampling rate in a feedback control system, the method comprising:

monitoring an error signal for a disturbance event, wherein the error signal is based on a difference between a setpoint and a feedback signal received from a control process;

evaluating the error signal to estimate a time constant of the control process in response to a detected disturbance event, wherein the time constant is a parameter that characterizes a response of the control process to the disturbance event and is estimated by evaluating a portion of the error signal associated with the disturbance event; and determining and using a sampling rate for the feedback control system based on the estimated time constant.

2. The method of claim 1, wherein monitoring the error signal for the disturbance event includes classifying the disturbance event as at least one of: a setpoint change and a load disturbance.

3. The method of claim 2, wherein if the disturbance event is classified as a setpoint change, evaluating the error signal in response to the disturbance event includes:

identifying a portion of the error signal estimated to be associated with the disturbance event;

tracking an area bounded by the identified portion error signal; and dividing the area bounded by the identified portion of the error signal by a magnitude of the setpoint change to determine the estimated time constant of the control process.

4. The method of claim 3, wherein identifying a portion of the error signal estimated to be associated with the disturbance event includes:

determining a time at which the setpoint change occurs;

determining a time at which a magnitude of the error signal crosses a magnitude threshold;

defining a tracking interval beginning at a time based on the time at which the setpoint change occurs and ending at a time based on the time at which the magnitude of the error signal crosses the magnitude threshold; and identifying a portion of the error signal which occurs during the tracking interval.

5. The method of claim 3, wherein tracking the area bounded by the identified portion of the error signal includes:

determining a magnitude of the error signal at a plurality of discrete time steps along the identified portion of the error signal;

determining an integrated error for each time step by multiplying the magnitude of the error signal at each time step by a duration of an interval between the time steps; and summing the integrated errors associated with each of the time steps along the identified portion of the error signal.

6. A method for adaptively and automatically adjusting a sampling rate in a feedback control system, the method comprising:

monitoring an error signal for a disturbance event, wherein the error signal is based on a difference between a setpoint and a feedback signal received from a control process;

evaluating the error signal to estimate a time constant of the control process in response to a detected disturbance event; and determining and using a sampling rate for the feedback control system based on the estimated time constant;

wherein monitoring the error signal for the disturbance event includes classifying the disturbance event as at least one of: a setpoint change and a load disturbance;

wherein if the disturbance event is classified as a load disturbance, evaluating the error signal in response to the disturbance event includes:

identifying a portion of the error signal estimated to be associated with the disturbance event;

tracking a magnitude of the error signal during the identified portion to determine a time at which the magnitude of the error signal reaches a maximum in response to the load disturbance;

subtracting a time at which the magnitude of the error signal begins to increase in response to the load disturbance from the time at which the magnitude of the error signal reaches the maximum to determine the estimated time constant of the control process.

7. The method of claim 1, wherein evaluating the error signal to estimate the time constant is conducted during a deviation from steady-state operation of the feedback control system.

8. The method of claim 1, wherein determining the sampling rate for use in the feedback control system includes selecting a sampling interval which is a fraction of the estimated time constant.

9. The method of claim 1, wherein determining the sampling rate for use in the feedback control system includes selecting a sampling interval between one-fortieth of the estimated time constant and the estimated time constant.

10. The method of claim 1, further comprising:

comparing the determined sampling rate with a previous sampling rate used by the feedback control system; and updating the previous sampling rate to the determined sampling rate if the comparison reveals that one or more updating criteria are met.

11. The method of claim 10, wherein the updating criteria include updating the previous sampling rate to the determined sampling rate if the determined sampling rate is at least twice the previous sampling rate.

12. The method of claim 10, wherein the updating criteria include updating the previous sampling rate to the determined sampling rate if the determined sampling rate is no greater than half the previous sampling rate.

13. A feedback control system for operating a control process, the system comprising:

a process controller having a processing circuit configured to:

monitor an error signal for a disturbance event, wherein the error signal is based on a difference between a setpoint and a feedback signal received from the control process;

evaluate the error signal in response to the disturbance event to estimate a time constant of the control process, wherein the time constant is a parameter that characterizes a response of the control process to the disturbance event and is estimated by evaluating a portion of the error signal associated with the disturbance event; and determine and use a sampling rate for the feedback control system based on the estimated time constant.

14. The system of claim 13, wherein monitoring the error signal for the disturbance event includes classifying the disturbance event as at least one of: a setpoint change and a load disturbance.

15. The system of claim 14, wherein if the disturbance event is classified as a setpoint change, evaluating the error signal in response to the disturbance event includes:

identifying a portion of the error signal estimated to be associated with the disturbance event;

tracking an area bounded by the identified portion error signal; and dividing the area bounded by the identified portion of the error signal by a magnitude of the setpoint change to determine the estimated time constant of the control process.

16. A feedback control system for operating a control process, the system comprising:

a process controller having a processing circuit configured to:

monitor an error signal for a disturbance event, wherein the error signal is based on a difference between a setpoint and a feedback signal received from the control process;

evaluate the error signal in response to the disturbance event to estimate a time constant of the control process; and determine and use a sampling rate for the feedback control system based on the estimated time constant;

wherein monitoring the error signal for the disturbance event includes classifying the disturbance event as at least one of: a setpoint change and a load disturbance;

wherein if the disturbance event is classified as a load disturbance, evaluating the error signal in response to the disturbance event includes:

identifying a portion of the error signal estimated to be associated with the disturbance event;

tracking a magnitude of the error signal during the identified portion to determine a time at which the magnitude of the error signal reaches a maximum in response to the load disturbance;

subtracting a time at which the magnitude of the error signal begins to increase in response to the load disturbance from the time at which the magnitude of the error signal reaches the maximum to determine the estimated time constant of the control process.

17. The system of claim 13, wherein determining the sampling rate for use in the feedback control system includes selecting a sampling interval which is no greater than the estimated time constant.

18. The system of claim 13, wherein the processing circuit is further configured to:

compare the determined sampling rate with a previous sampling rate used by the feedback control system; and update the previous sampling rate to the determined sampling rate if the comparison reveals that one or more updating criteria are met;

wherein the updating criteria relate to one or more of: a value of the determined sampling rate, a difference between the determined sampling rate and the previous sampling rate, and a ratio of the determined sampling rate to the previous sampling rate.

19. The system of claim 18, wherein the updating criteria include updating the previous sampling rate to the determined sampling rate if the determined sampling rate is at least twice the previous sampling rate or no greater than half the previous sampling rate.

* * * * *